United States Patent
Lee

(10) Patent No.: US 12,472,974 B2
(45) Date of Patent: Nov. 18, 2025

(54) VEHICLE COLLISION AVOIDANCE SYSTEM AND METHOD

(71) Applicant: HYUNDAI MOBIS CO., LTD., Seoul (KR)

(72) Inventor: Choong Ryung Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 453 days.

(21) Appl. No.: 17/548,218

(22) Filed: Dec. 10, 2021

(65) Prior Publication Data

US 2022/0194411 A1  Jun. 23, 2022

(30) Foreign Application Priority Data

Dec. 21, 2020 (KR) .................. 10-2020-0179561

(51) Int. Cl.
  *B60W 50/16* (2020.01)
  *B60K 35/10* (2024.01)
  (Continued)

(52) U.S. Cl.
  CPC ............ *B60W 50/16* (2013.01); *B60K 35/10* (2024.01); *B60K 35/25* (2024.01); *B60K 35/26* (2024.01);
  (Continued)

(58) Field of Classification Search
  CPC ..... B60W 2050/143; B60W 2050/146; B60W 50/16; B60W 10/20; B60W 30/09;
  (Continued)

(56) References Cited

U.S. PATENT DOCUMENTS

2004/0073367 A1 *  4/2004  Altan ............... B60W 30/16
                                                      340/436
2005/0080565 A1 *  4/2005  Olney .............. B60W 50/16
                                                      340/903

(Continued)

FOREIGN PATENT DOCUMENTS

DE   102016002442 A1 *  9/2016  ............ B60Q 9/008
JP      H0858503 A   *  3/1996
KR     20180039838   *  4/2018  ............ B60W 50/14

OTHER PUBLICATIONS

Xue, Q., Yan, X., Li, X., & Wang, Y. (2018). Uncertainty analysis of rear-end collision risk based on car-following driving simulation experiments. Discrete Dynamics in Nature and Society, 2018, 13. doi:https://doi.org/10.1155/2018/5861249 (Year: 2018).*

(Continued)

*Primary Examiner* — Helal A Algahaim
*Assistant Examiner* — Leah N Miller
(74) *Attorney, Agent, or Firm* — DLA PIPER US

(57) ABSTRACT

A vehicle collision avoidance system and method. The vehicle collision avoidance system includes an input unit configured to receive driving information of a host vehicle and driving information of a rear vehicle, a memory configured to store a program that calculates a collision risk level using the driving information of the host vehicle and the driving information of the rear vehicle, and a processor configured to execute the program, wherein the processor performs control to display visual information about the risk of collision upon a right or left lane change based on the collision risk level.

9 Claims, 13 Drawing Sheets

DRIVER SELECTION

DRIVER MODEL SEGMENTATION
$\mu_1, \sigma_1$ : DEFENSIVE DRIVER
$\mu_2, \sigma_2$ : NORMAL DRIVER
$\mu_3, \sigma_3$ : AGGRESSIVE DRIVER
......

$$Z1 = \frac{\alpha_{tc} - \mu 1}{\sigma 1}$$

$$Z2 = \frac{\alpha_{tc} - \mu 2}{\sigma 2}$$

$$Z3 = \frac{\alpha_{tc} - \mu 3}{\sigma 3}$$

$\Phi_1(z_1)$
$\Phi_2(z_2)$
$\Phi_3(z_3)$
......

(51) Int. Cl.

| | |
|---|---|
| *B60K 35/25* | (2024.01) |
| *B60K 35/26* | (2024.01) |
| *B60K 35/28* | (2024.01) |
| *B60K 35/70* | (2024.01) |
| *B60W 10/18* | (2012.01) |
| *B60W 10/20* | (2006.01) |
| *B60W 30/09* | (2012.01) |
| *B60W 30/095* | (2012.01) |
| *B60W 40/105* | (2012.01) |
| *B60W 50/14* | (2020.01) |

(52) U.S. Cl.
CPC .............. *B60K 35/28* (2024.01); *B60K 35/70* (2024.01); *B60W 10/18* (2013.01); *B60W 10/20* (2013.01); *B60W 30/09* (2013.01); *B60W 30/0956* (2013.01); *B60W 40/105* (2013.01); *B60W 2050/143* (2013.01); *B60W 2050/146* (2013.01); *B60W 2510/202* (2013.01); *B60W 2554/80* (2020.02)

(58) Field of Classification Search
CPC ........... B60W 30/0956; B60W 40/105; B60W 2554/80; B60W 2510/18; B60W 2510/202; B60W 2520/105; B60W 30/18163; B60W 50/14; B60W 30/08; B60W 2520/10; B60K 2360/178; B60K 2360/179; B60K 2360/21; B60K 35/28; B60K 2360/652; B60Y 2300/08; B60Y 2300/18166
USPC ......................................................... 701/301
See application file for complete search history.

(56) References Cited

U.S. PATENT DOCUMENTS

| | | | |
|---|---|---|---|
| 2013/0342337 A1* | 12/2013 | Kiefer .................. | B60W 50/16 340/438 |
| 2017/0291546 A1* | 10/2017 | Lai ........................ | B60Q 9/008 |
| 2019/0088138 A1* | 3/2019 | Kang .................... | B60W 10/20 |
| 2020/0238904 A1* | 7/2020 | Kim ...................... | B60W 10/20 |

OTHER PUBLICATIONS

S. Joerer, M. Segata, B. Bloessl, R. Lo Cigno, C. Sommer and F. Dressler, "A Vehicular Networking Perspective on Estimating Vehicle Collision Probability at Intersections," in IEEE Transactions on Vehicular Technology, vol. 63, No. 4, pp. 1802-1812, May 2014, doi: 10.1109/TVT.2013.2287343. (Year: 2014).*

Korean Office Action dated Sep. 5, 2025 issued in KR 10-2020-0179561.

* cited by examiner

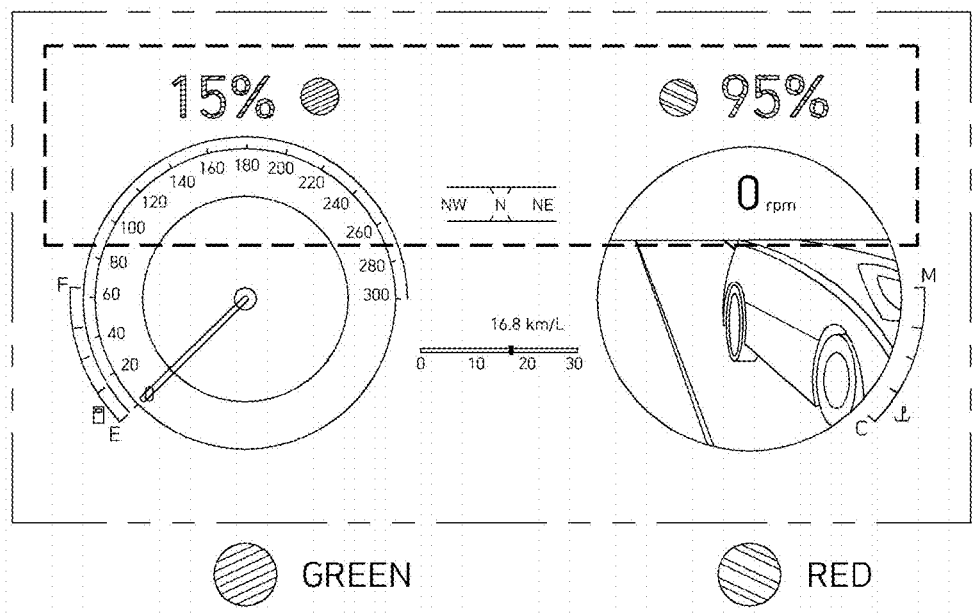

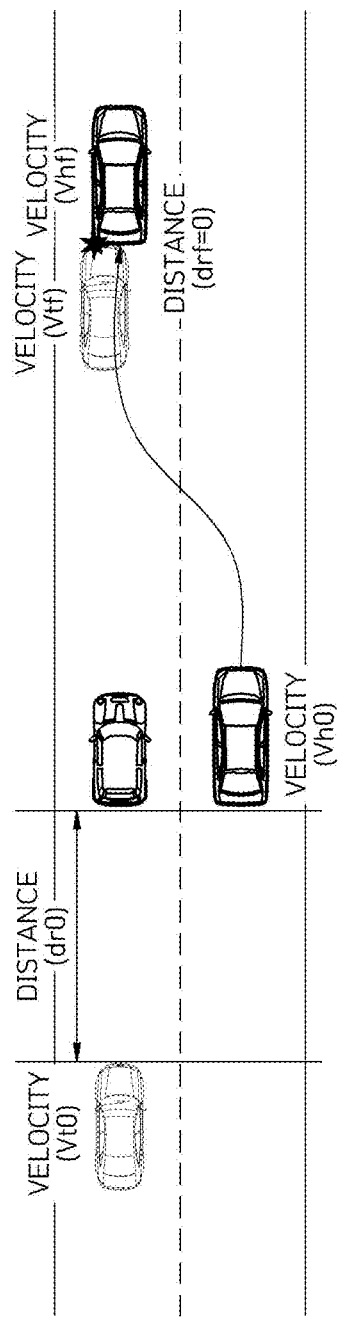

VEHICLE COLLISION AVOIDANCE SYSTEM AND METHOD

CROSS-REFERENCE TO RELATED APPLICATION

This application claims priority to and the benefit of Korean Patent Application No. 2020-0179561, filed on Dec. 21, 2020, the disclosure of which is incorporated herein by reference in its entirety.

BACKGROUND

Field of the Invention

The present invention relates to a vehicle collision avoidance system and method.

Discussion of Related Art

If a driver wants to change lanes, he or she must recognize the presence of a rear vehicle by using the rearview mirror or the side mirror and change lanes in a situation where it is determined that there is no risk of collision. The determination may be difficult at night or in bad weather.

According to the related art, a blind-spot collision-avoidance system has been proposed, but this only informs about the risk of collision on the basis of distance information and does not provide a warning for more intuitive and reliable vehicle collision avoidance.

SUMMARY OF THE INVENTION

The present invention has been proposed to solve the above problems and is directed to providing a vehicle collision avoidance system and method for calculating a crash probability of collision with a rear vehicle and displaying the degree of safety for a lane change on the basis of the risk of collision with the rear vehicle.

According to an aspect of the present invention, there is provided a vehicle collision avoidance system including an input unit configured to receive driving information of a host vehicle and driving information of a rear vehicle, a memory configured to store a program that calculates a collision risk level using the driving information of the host vehicle and the driving information of the rear vehicle, and processor configured to execute the program, wherein the processor performs control to display visual information about a risk of collision upon a right or left lane change on the basis of the collision risk level.

The input unit receives information on the size and location of a vehicle from a camera.

The input unit collects velocity data of a vehicle in a specific area from a rear active sensor.

The processor receives map information and TTC information and calculates the risk of collision between the host vehicle and the rear vehicle.

The processor performs control to change and provide at least one of a color, gauge, and text of the visual information with reference to a risk grade according to a result of calculating a crash probability.

The processor performs control to provide a warning by differently adjusting an alarm sound or a vibration (steering wheel vibration) according to a result of calculating a crash probability.

The processor performs control to generate a steering wheel steering torque in an opposite direction of steering according to a result of calculating a crash probability.

The processor calculates the risk of collision using the driving velocity of the host vehicle, the driving velocity of the rear vehicle, and the brake input of the driver of the host vehicle.

According to another aspect of the present invention, there is provided a vehicle collision avoidance method including operations of (a) receiving driving information of a host vehicle, (b) receiving driving information of a rear vehicle, and (c) calculating a risk level of collision between the host vehicle and the rear vehicle and providing a warning about a risk of collision on the basis of the collision risk level.

Operation (a) is an operation of receiving the driving speed and acceleration and deceleration information of a host vehicle.

Operation (b) is an operation of receiving the driving speed and acceleration/deceleration information of a rear vehicle.

Operation (c) is an operation of performing control to display visual information about the risk of collision upon a left or right lane change with respect to the driving lane of the host vehicle.

Operation (c) is an operation of performing control to change and display at least one of a color, gauge, and text of the visual information with reference to a risk grade according to a result of calculating the collision risk level.

Operation (c) is an operation of providing at least one of an alarm sound or a steering wheel vibration according to a result of calculating the collision risk level.

Operation (c) is an operation of generating a steering wheel steering torque in an opposite direction of steering when attempting to change lanes to a lane with a calculated collision risk level greater than or equal to a preset level.

BRIEF DESCRIPTION OF THE DRAWINGS

FIG. 2, FIG. 3A through FIG. 3F show a safety information indication using a risk level of vehicle collision according to an embodiment of the present invention.

FIG. 4 shows a situation in which a host vehicle and a rear vehicle are traveling according to an embodiment of the present invention.

DETAILED DESCRIPTION OF EXEMPLARY EMBODIMENTS

Figure 1:
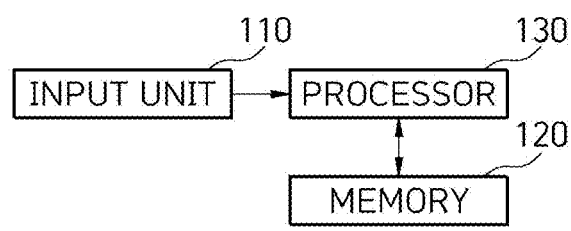
FIG. 1 shows a vehicle collision avoidance system according to an embodiment of the present invention.

These and other objects, advantages, and features of the present invention and implementation methods thereof will be clarified through the following embodiments described with reference to the accompanying drawings.

The present invention may, however, be embodied in different forms and should not be construed as being limited to the embodiments set forth herein. Rather, these embodiments are provided so that this disclosure will fully convey the objects, configurations, and effects of the present invention to those skilled in the art. The scope of the present invention is defined solely by the appended claims.

The terminology used herein is for the purpose of describing particular embodiments only and is not intended to be limiting of the invention. Herein, the singular shall be construed to include the plural, unless the context clearly indicates otherwise. The terms "comprises" and/or "comprising" used herein specify the presence of stated elements, steps, operations, and/or components, but do not preclude the presence or addition of one or more other elements, steps, operations, and/or components.

Hereinafter, in order to help those skilled in the art to understand the present invention, the background of the present invention will be described first, and then the embodiments of the present invention will be described.

For a safe lane change, drivers visually check the presence of other vehicles using the rearview mirror or side mirror and change lanes according to a result of the check. However, it is difficult to determine a lane change using visual information in rain or night conditions.

When another vehicle or an object enters a specific range, a blind-spot warning system according to the related art provides a collision warning in a side mirror and an in-vehicle system on the basis of host-vehicle reference distance information.

However, these Blind Spot Detection (BSD) warning lights indicate only information on whether another vehicle or an obstacle is within a certain range of a rear and side area in an on/off manner, and thus there is a limitation in that it is difficult for a driver of a host vehicle to determine the risk of collision with other vehicles.

For example, even if the distance between vehicles is somewhat close, this may be sufficient to perform a lane change when relative velocities are taken into account, and even if the distance between vehicles is somewhat far, this may be a dangerous situation in which a lane change should not be performed when relative velocities is taken into consideration. Nevertheless, there is a limitation in that an intuitive and practical warning cannot be provided by notifying a driver about the danger of a lane change based on just a distance.

Also, since a scheme of providing a vibration or an alarm sound is operated only when a driver turns on a signal light and attempts to change lanes, a warning is not provided at the stage where a driver decides whether to change lanes before attempting to change lanes.

The present invention has been proposed to solve the above problems and proposes a vehicle collision avoidance system and method for delivering collision risk information to a driver, intuitively determining a collision risk level, and supporting a safe lane change on the basis of the collision risk level by using a vehicle's external environmental sensor to detect the presence and the driving situation of a traveling vehicle behind and to the side of a host vehicle.

According to an embodiment of the present invention, by visually providing information on the risk of collision with a rear vehicle in various colors and numbers on the assumption of a lane change situation, it is possible to allow a driver to intuitively recognize information on how dangerous it would be for the driver to try to change lanes now, and it is also possible to assist the driver in making a decision about whether to change lanes more easily and quickly.

According to an embodiment of the present invention, even in environments such as driving at night or in bad weather, by supporting easy lane changes and notifying a driver of the risk of collisions to the left and right, it is possible for the driver to intuitively recognize in which direction changing lanes is safe.

According to an embodiment of the present invention, by calculating a crash probability by using the velocity, distance information, and acceleration and deceleration information of a host vehicle and a rear vehicle to reduce the gap between a collision risk level intuitively perceived by the driver and a collision risk level provided by the vehicle collision avoidance system, the reliability of the system can be increased.

FIG. 1 shows a vehicle collision avoidance system according to an embodiment of the present invention.

The vehicle collision avoidance system according to an embodiment of the present invention includes an input unit 110 configured to receive the driving information of a host vehicle and the driving information of a rear vehicle, a memory 120 configured to store a program that calculates a collision risk level using the driving information of the host vehicle and the driving information of the rear vehicle, and a processor 130 configured to execute the program. The processor 130 performs control to display visual information about the risk of collision upon a right or left lane change on the basis of the collision risk level.

The input unit 110 receives information on the size and location of a vehicle from a camera.

The input unit 110 collects velocity data of a vehicle in a specific area from a rear active sensor.

At this time, the rear active sensor may sense left and right lanes and a rear preset distance (e.g., 25 meters) or less, and the detection area may be expanded to 50 meters or more for step-by-step detection.

The processor 130 receives map information and time-to-collision (TTC) information and calculates a crash probability between the host vehicle and the rear vehicle.

According to the crash probability calculation result, the processor 130 performs control to change and provide at least one of the color, gauge, and text of the visual information according to a risk grade.

The processor 130 provides an output by using an LED notification light to which a preset number of colors (e.g., four colors) are applied to an indoor location on the same line toward a side mirror.

A preset number of colors may be applied to a BSD icon displayed on an outdoor side mirror.

The processor 130 performs control to provide a warning by differently adjusting an alarm sound or a vibration (a steering wheel vibration) according to the crash probability calculation result.

The processor 130 performs control to generate a steering wheel steering torque in the opposite direction of steering according to the crash probability calculation result.

The processor 130 calculates the risk of collision using the driving velocity of the host vehicle, the driving velocity of the rear vehicle, and the braking input of the driver of the host vehicle.

Figure 2:
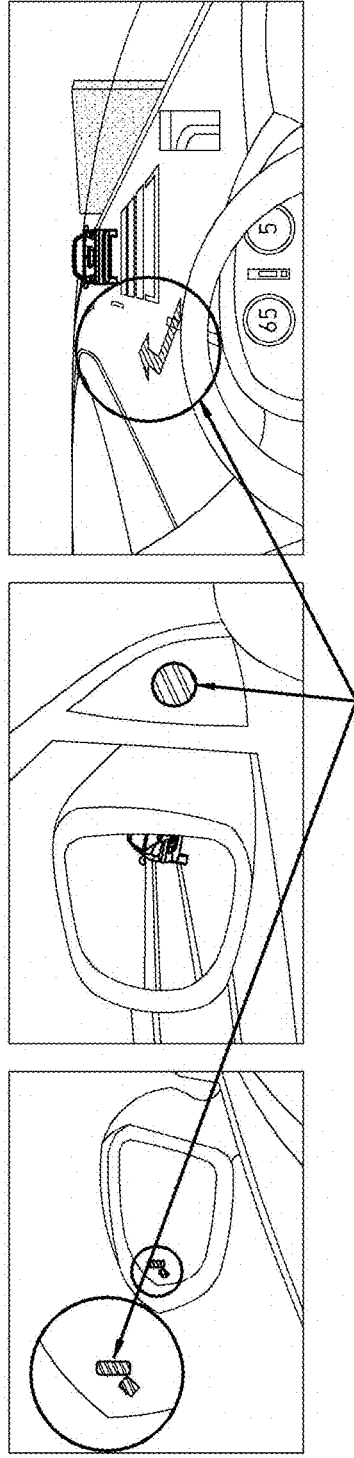

FIGS. 2 and 3 show a safety information indication using a risk level of vehicle collision according to an embodiment of the present invention.

Referring to FIG. 2, when there is no vehicle behind, a green LED light is turned on.

When there is a vehicle behind but the risk level is low, a blue LED light is turned on to indicate that caution is required when attempting to change lanes.

When there is a vehicle behind and the risk level is high, a yellow LED light is turned on so as to recommend that the current driving lane is maintained. At this time, when an attempt is made to change lanes, an alarm sound and a vibration alarm are provided.

When there is a vehicle behind and the risk of collision is detected, a red LED light is turned on so as to inform the driver that the lane change is not possible. At this time, when an attempt is made to change lanes, an alarm sound and a vibration alarm are provided, and a steering torque is generated in the opposite direction to the steering.

Referring to FIG. 3A, a risk level upon a left lane change and a risk level upon a right lane change are displayed in a cluster with differently adjusted text and colors.

Figure 3B:
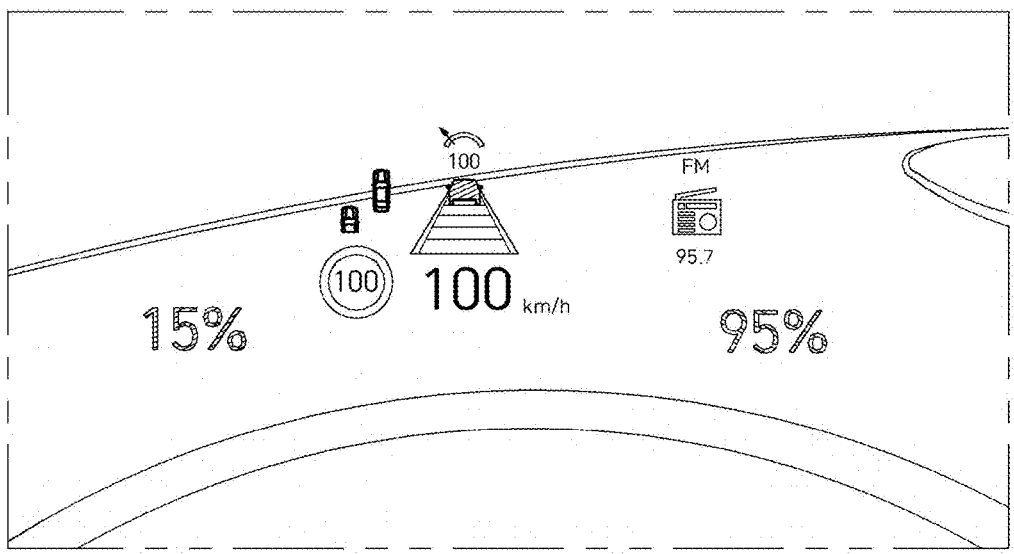

Referring to FIG. 3B, a risk level upon a left lane change and a risk level upon a right lane change are displayed on a head-up display (HUD) with differently adjusted text and colors.

Figure 3C:
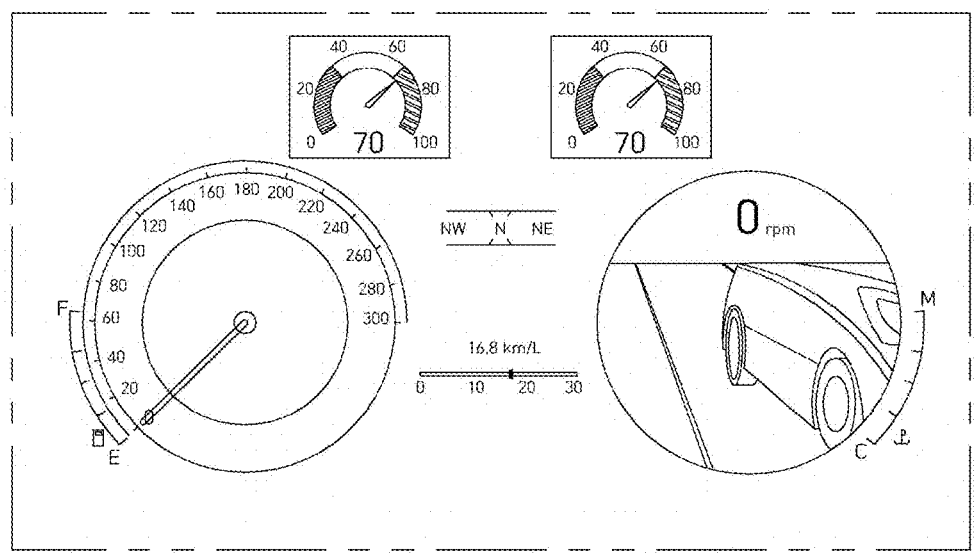
Figure 3D:
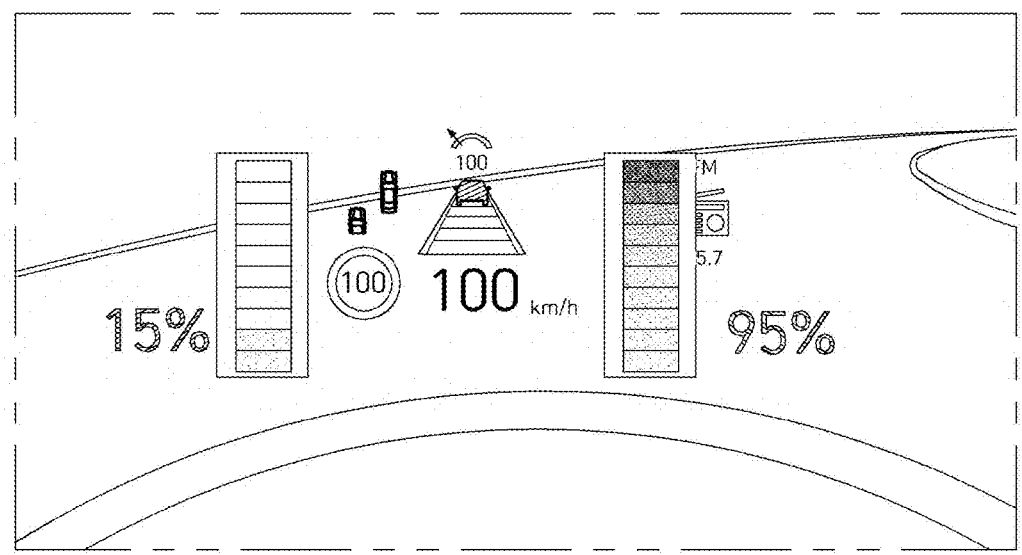

Referring to FIGS. 3C and 3D, by applying a meter gauge type or a volume gauge type, risk level information is visually provided to a driver in various gauge forms.

Figure 3E:
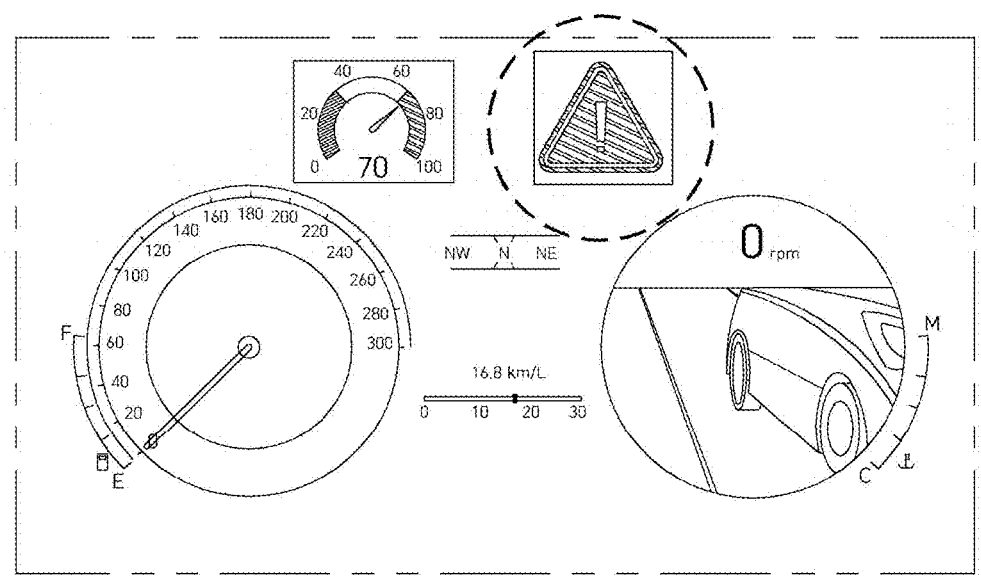
Figure 3F:
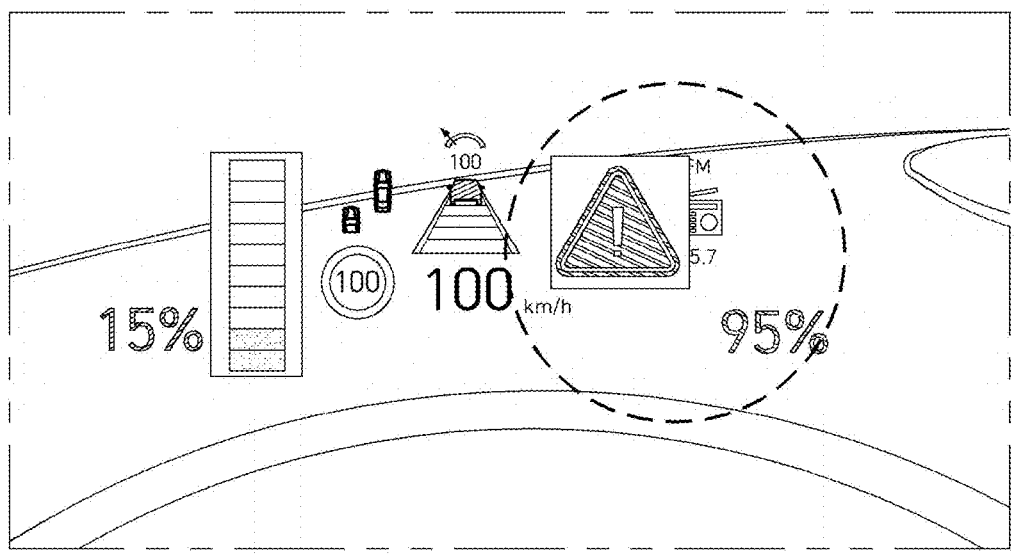

Referring to FIGS. 3E and 3F, a crash probability greater than or equal to a preset level is set as a lane change disabled situation, and a warning sign indicating the lane change disabled situation is visually provided when the crash probability greater than or equal to the preset level is calculated.

FIGS. 3E and 3F show a warning sign indicating that a right lane change is not possible. In this case, when a driver attempts to change lanes to the right, a warning is provided by an alarm sound and a steering wheel vibration, and when a steering torque to the right lane is generated, an auxiliary torque is generated in the opposite direction to the steering.

FIG. 4 shows a situation in which a host vehicle and a rear vehicle are traveling according to an embodiment of the present invention.

In order to provide a warning based on a collision risk level of collision with a vehicle behind when changing lanes, the collision risk level should be calculated on the assumption of the lane change situation of a host vehicle. Accordingly, it is assumed that a rear vehicle and a host vehicle are traveling in the same lane, and the collision risk level is calculated based on the driving information of the host vehicle and the driving information of the rear vehicle in real time.

According to the related art, the risk of collision is calculated using only distance information or TTC. However, according to the present invention, it is possible to calculate the collision risk level that is intuitively recognized and acceptable by a driver of a host vehicle by calculating the risk of collision in consideration of a relative distance dr, a host vehicle velocity Vh0, a rear vehicle velocity Vt0, and a braking input of the driver of the host vehicle and providing an alarm on the basis of the calculated risk of collision.

As described above, the risk level of collision is calculated on the assumption of the lane change situation of a host vehicle, and thus it is assumed that a vehicle detected in the rear area is traveling in the same lane as the host vehicle.

Under "heading angle 0 degree" condition (in the case of driving side by side), a critical condition in which two vehicles traveling side by side may use only a braking input without steering to avoid collision is a condition in which the relative velocity of the two vehicles becomes zero just before the collision occurs.

When the host vehicle and the rear vehicle (hereinafter also referred to as a threat vehicle) decelerate, the time required for the relative velocity of the two vehicles to become zero is as shown in Equation 1 below (time condition; here, Vt0>Vh0).

$$V_r = V_{t0} - V_{h0} = 0$$ [Equation 1]

$$V_t = V_{t0} + a_t {}^tRequired$$

$$V_h = V_{h0} + a_h {}^tRequired$$

$$V_{t0} = V_{h0} + (a_t - a_h)^tRequired = 0$$

$$^tRequired = -\frac{V_{t0} - V_{h0}}{a_t - a_h}$$

Here,
$V_r$=Relative velocity
$V_{h0}, V_{t0}$=Host/Threat vehicle initial velocity, respectively
$a_h, a_t$=Host/Threat vehicle deceleration, respectively
$t_{Required}$=Required time for $V_r$=0

That is, during the required time tRequired for achieving the collision avoidance condition (relative velocity: 0) between the host vehicle and the threat vehicle, the threat vehicle should not come into contact with the host vehicle.

Referring to Equation 2, when the distance traveled by the threat vehicle during the required time tRequired is greater than the sum of the distance traveled by the host vehicle during the required time tRequired and an initial relative distance d0, a collision occurs (distance condition).

$$d_t \geq d_h + d_0$$

$$d_t = V_{t0}t + \frac{1}{2}a_t t^2$$

$$d_h = V_{h0}t + \frac{1}{2}a_h t^2$$

$$V_{t0}t + \frac{1}{2}a_t t^2 \geq V_{h0}t + \frac{1}{2}a_h t^2 + d_0$$ [Equation 2]

Here,
$d_h, d_t$=Host/Threat vehicle displacement, respectively
$d_0$=Current distance between host vehicle and threat vehicle In order to avoid collision between the host vehicle and the threat vehicle, the time condition in [Equation 1] and the distance condition in [Equation 2] should be simultaneously satisfied.

Equation 3 is obtained by substituting the required time tRequired of Equation 1 to t in Equation 2 and arranging the terms with the acceleration or deceleration of the threat vehicle.

$$a_t \geq -\frac{(V_{t0} - V_{h0})^2}{2d_0} + a_h$$ [Equation 3]

where $a_t < a_h$ $a_t > 0$: Acceleration $a_t < 0$: Deceleration

That is, when the deceleration of the rear vehicle is less than or equal to a certain level while the host vehicle changes lanes, an accident occurs.

Figure 5:
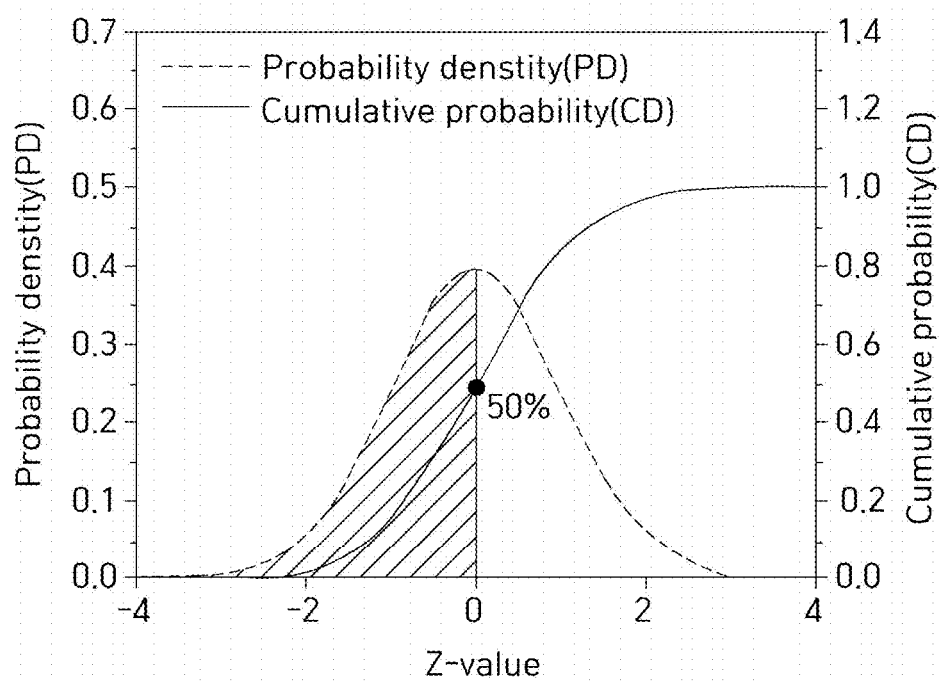
FIG. 5 shows a distribution of a braking input according to an embodiment of the present invention.

FIG. 5 shows a distribution of a braking input according to an embodiment of the present invention.

It is assumed that a braking input (vehicle deceleration) used by a driver as a means for risk avoidance under general road conditions is normally distributed with a specific mean and variance. In this case, as shown in Equation 3, the critical deceleration of the threat vehicle is determined to avoid collision in specific situations Vh0, Vt0, d0 and ah of the host vehicle and the threat vehicle, an accident occurs when the threat vehicle travels at a deceleration lower than the critical deceleration, and collision avoidance is possible when a deceleration higher than the critical deceleration is used.

As in Equations 4 and 5, the probability (risk) of an accident with the threat vehicle due to the lane change of the host vehicle in a specific driving situation may be expressed by calculating the cumulative probability of up to the critical deceleration of the threat vehicle in the distribution of the driver's braking input.

$$\text{Crash probability} = \Phi(z) \quad \text{[Equation 4]}$$
$$\Phi(z) = P(Z \leq z); \text{ cumulative probability}$$

$$a_{tc} = -\frac{(V_{t0} - V_{h0})^2}{2d_0} + a_h \quad \text{[Equation 5]}$$
$$Z = \frac{a_{tc} - \mu}{\sigma}$$

When it is assumed that a driver deceleration model follows a normal distribution, the crash probability may be calculated as in Equation 6. Equation 7 is obtained by utilizing the definition of TTC to substitute and arrange the distance d0 from the rear vehicle.

$$\Phi(Z) = P(Z \leq z) = \int_{-z}^{z} \frac{1}{\sqrt{2\pi}} e^{-\frac{1}{2}u^2} du \quad \text{[Equation 6]}$$

$$d_0 = (V_{t0} - V_{h0})TTC \quad \text{[Equation 7]}$$
$$a_t \geq -\frac{V_{t0} - V_{h0}}{2TTC} + a_h$$

Figure 6:
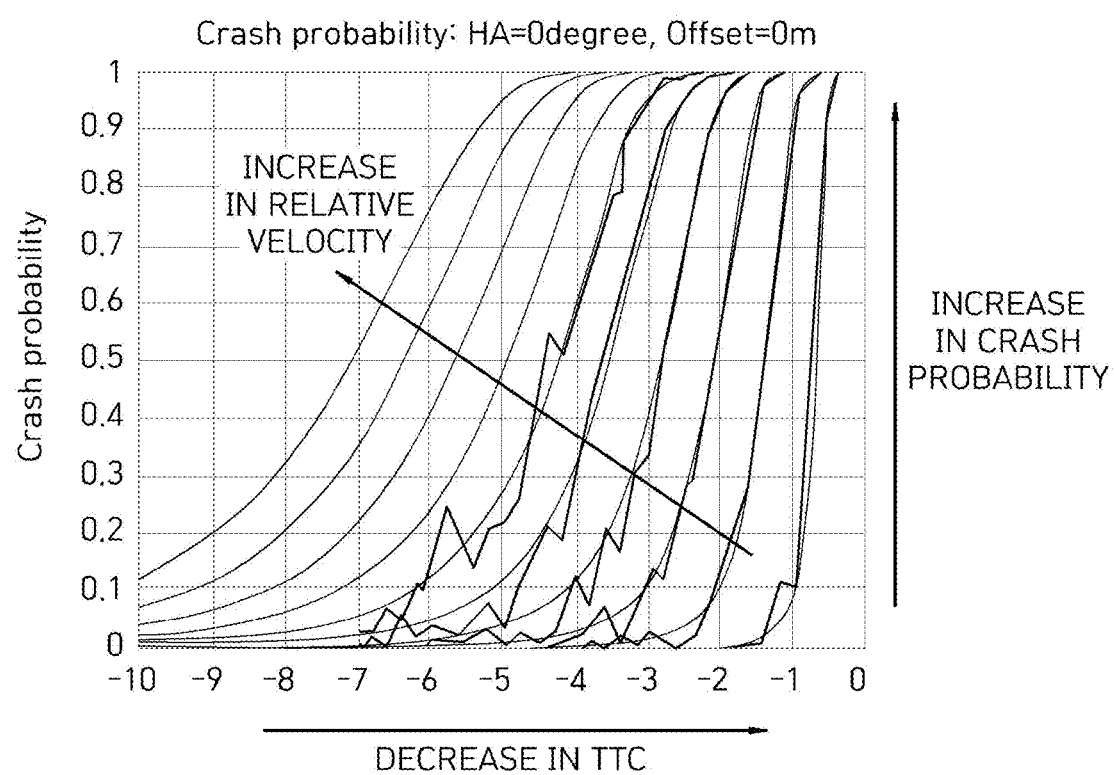
FIG. 6 shows a time-to-collision (TTC), a relative velocity, and a crash probability according to an embodiment of the present invention.

FIG. 6 shows a time-to-collision (TTC), a relative velocity, and a crash probability according to an embodiment of the present invention.

When it is assumed that a host vehicle changes lanes without acceleration or deceleration (the case of ah=0), the cumulative probability of the distribution of "at" is expressed according to the change in TTC with respect to the relative velocity as shown in FIG. 6.

It can be seen that the crash probability increases as the TTC decreases and the relative velocity increases.

According to an embodiment of the present invention, by using velocity information, distance information, and acceleration and deceleration information to calculate the crash probability between the host vehicle and the rear vehicle, it is possible to calculate a crash probability that is more accurate and intuitively acceptable to the driver.

According to an embodiment of the present invention, the deceleration of the preceding vehicle (host vehicle) is also included in order to use the critical deceleration of the rear vehicle. Accordingly, when the host vehicle decelerates and attempts to change lanes, the crash probability increases rapidly, and thus it is possible to accurately calculate a collision risk level.

According to an embodiment of the present invention, it is possible to calculate the crash probability through a simple formula without performing a stochastic analysis using a vehicle model and performing complex modeling.

By calculating the crash probability based on the driving situation of the host vehicle and the rear vehicle and notifying the driver of the crash probability in real time, the driver of the host vehicle can always recognize the expected collision risk level with the rear vehicle when changing lanes. Using this, it is possible to assist in performing a safe lane change.

The driver of the host vehicle uses lane change risk level information that is always displayed on a cluster, an HUD, a side mirror, etc. to quickly change lanes to a safe lane even when the driving situation changes rapidly.

Figure 7:
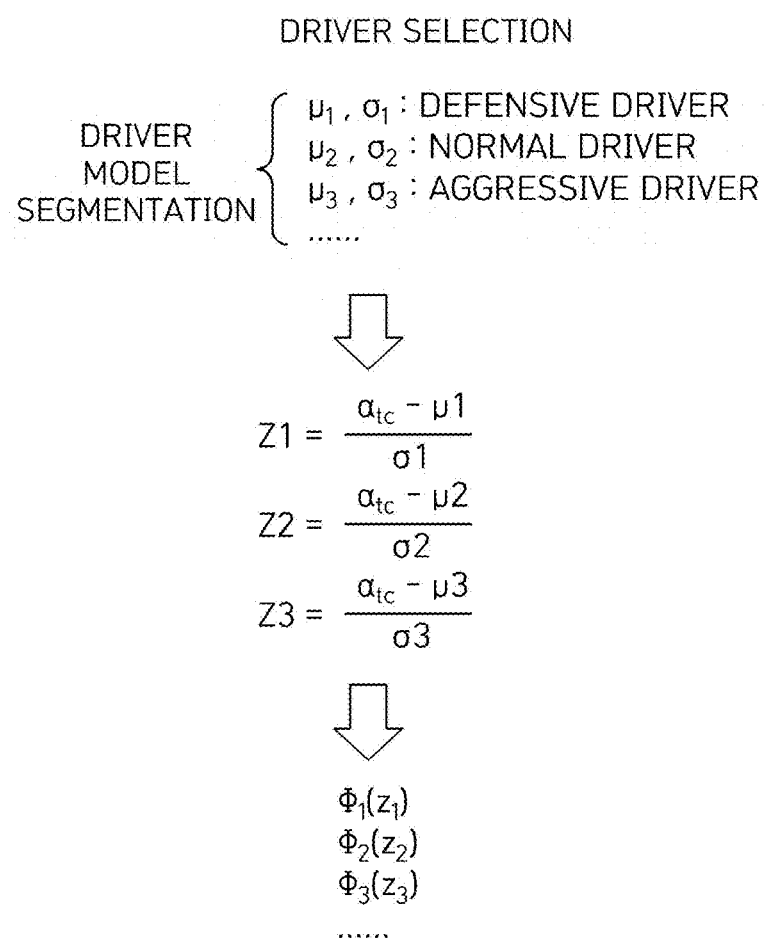
FIG. 7 shows the adjustment of collision warning calculation sensitivity according to driver classification according to an embodiment of the present invention.

FIG. 7 shows the adjustment of collision warning calculation sensitivity by driver classification according to an embodiment of the present invention.

According to an embodiment of the present invention, by setting the mean and variance models of the driver deceleration distribution model to a preset number of sets using a driver deceleration distribution model and receiving a driver's selection, it is possible to adjust the sensitivity of the collision alarm calculation.

Figure 8:
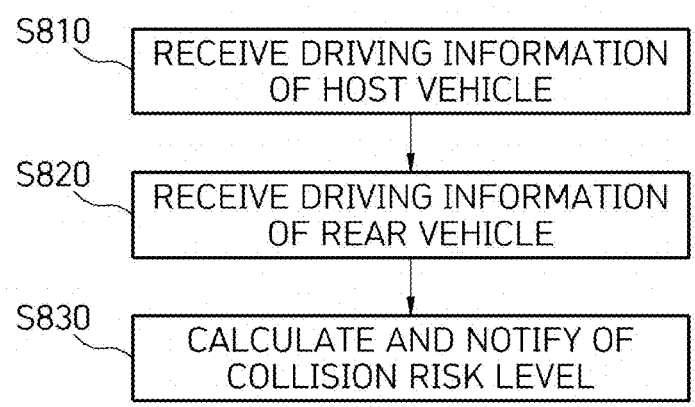
FIG. 8 shows a vehicle collision avoidance method according to an embodiment of the present invention.

FIG. 8 shows a vehicle collision avoidance method according to an embodiment of the present invention.

The vehicle collision avoidance method according to an embodiment of the present invention includes receiving driving information of a host vehicle (S810), receiving driving information of a rear vehicle (S820), and calculating a risk level of collision between the host vehicle and the rear vehicle and providing a warning about the risk of collision on the basis of the collision risk level (S830).

Operation S810 is an operation of receiving the driving velocity and acceleration and deceleration information of a host vehicle.

Operation S820 is an operation of receiving the driving velocity and acceleration and deceleration information of a rear vehicle.

Operation S830 is an operation of performing control to display visual information about the risk of collision upon a left or right lane change with respect to the driving lane of the host vehicle.

Operation S830 is an operation of performing control to change and display at least one of the color, gauge, and text of the visual information with reference to a risk grade according to a result of calculating the collision risk level.

Operation S830 is an operation of providing at least one of an alarm sound or a steering wheel vibration according to a result of calculating the collision risk level.

Operation S830 is an operation of generating a steering wheel steering torque in the opposite direction of steering when attempting to change lanes to a lane with a calculated collision risk level greater than or equal to a preset level.

According to the present invention, a driver can always recognize the risk level of collision for left and right lanes, and thus in the event of sudden danger ahead, it is possible to help avoid a collision by quickly changing lanes to a safe side.

When it is difficult to make a decision using side mirrors and rearview mirrors due to night and rain conditions, it is possible to change lanes using information on left and right rear-end collision probabilities.

By providing both of the risks of collision to the left and right, a driver can compare the left and right risks and select a target lane to be changed.

By calculating a collision risk level using the velocities, distances, and acceleration and deceleration information of a traveling vehicle and a target vehicle, it is possible to calculate a crash probability that is accurate and intuitively acceptable by a driver.

Effects of the present invention are not limited to the aforementioned effects, and other effects which are not mentioned here can be clearly understood by those skilled in the art from the following description.

Meanwhile, the vehicle collision prevention method according to an embodiment of the present invention may be implemented in a computer system or recorded on a recording medium. The computer system may include at least one processor, memory, user input device, data communication bus, user output device, and storage. The above-described elements perform data communication through the data communication bus.

The computer system may further include a network interface coupled to a network. The processor may be a central processing unit (CPU) or a semiconductor device for processing instructions stored in a memory and/or a storage.

The memory and storage may include various types of volatile or non-volatile storage media. For example, the memory may include a read-only memory (ROM) and a random access memory (RAM).

Accordingly, the driving control method according to an embodiment of the present invention may be implemented as a computer-executable method. When the driving control method according to an embodiment of the present invention is performed by a computer device, computer-readable instructions may implement the driving control method according to an embodiment of the present invention.

Meanwhile, the driving control method according to the present invention may be embodied as computer-readable code on a computer-readable recording medium. The computer-readable recording medium includes all types of recording media where data that can be decrypted by a computer system is stored. For example, the computer-readable recording medium may include a ROM, a RAM, a magnetic tape, a magnetic disk, a flash memory, an optical data storage device, and the like. Further, the computer-readable recording media can be stored and carried out as codes that are distributed in a computer system connected to a computer network and are readable in a distributed manner.

What is claimed is:

1. A vehicle collision avoidance system comprising:
an input unit configured to receive driving information of a host vehicle and driving information of a rear vehicle;
a memory configured to store a program that generates a collision risk level based on calculating a crash probability using the driving information of the host vehicle and the driving information of the rear vehicle, wherein the crash probability is calculated based on calculating a cumulative probability in a distribution of a braking input to the host vehicle up to a critical deceleration of the rear vehicle; and
a processor configured to execute the program,
wherein the processor performs control to display visual information about a risk of collision upon a right or left lane change based on the collision risk level;
wherein the processor sets a plurality of mean and variance models of a driver deceleration distribution model into a preset number of sets, and adjusts a sensitivity of a collision alarm calculation based on a model selected by the driver from among the preset number of sets.

2. The vehicle collision avoidance system of claim 1, wherein the processor receives map information and time-to-collision (TTC) information and calculates the crash probability between the host vehicle and the rear vehicle.

3. The vehicle collision avoidance system of claim 1, wherein the processor provides a warning using at least one of an alarm sound and a steering wheel vibration according to a result of calculating the crash probability.

4. The vehicle collision avoidance system of claim 3, wherein the processor performs control to generate a steering wheel steering torque in an opposite direction of steering according to a result of calculating the crash probability.

5. The vehicle collision avoidance system of claim 1, wherein the processor calculates the crash probability using a driving velocity of the host vehicle, a driving velocity of the rear vehicle, and the braking input of a driver of the host vehicle.

6. A vehicle collision avoidance method comprising operations of:
(a) receiving driving information of a host vehicle;
(b) receiving driving information of a rear vehicle;
(c) generating a collision risk level based on calculating a crash probability between the host vehicle and the rear vehicle and providing a warning about a risk of collision expected upon a left or right lane change based on the collision risk level, wherein the crash probability is calculated based on calculating a cumulative probability in a distribution of a braking input to the host vehicle up to a critical deceleration of the rear vehicle;
setting a plurality of mean and variance models of a driver deceleration distribution model into a preset number of sets; and
adjusting a sensitivity of a collision alarm calculation based on a model selected by the driver from among the preset number of sets.

7. The vehicle collision avoidance method of claim 6, wherein operation (a) is an operation of receiving a driving velocity and acceleration and deceleration information of the host vehicle.

8. The vehicle collision avoidance method of claim 6, wherein operation (b) is an operation of receiving a driving velocity and acceleration and deceleration information of the rear vehicle.

9. The vehicle collision avoidance method of claim 6, wherein operation (c) is an operation of providing a warning using at least one of an alarm sound and a steering wheel vibration according to a result of generating a collision risk level and generating a steering wheel steering torque in an opposite direction of steering when attempting to change lanes to a lane with a generated collision risk level greater than or equal to a preset level.

* * * * *